United States Patent
Wu

(10) Patent No.: US 9,573,444 B2
(45) Date of Patent: Feb. 21, 2017

(54) AUTOMOBILE AND ANTI-DAZZLING METHOD FOR AUTOMOBILES

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Wei-Feng Wu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 154 days.

(21) Appl. No.: 14/658,444

(22) Filed: Mar. 16, 2015

(65) Prior Publication Data
US 2015/0268500 A1    Sep. 24, 2015

(30) Foreign Application Priority Data
Mar. 18, 2014   (CN) .......................... 2014 1 0099024

(51) Int. Cl.
G02F 1/133   (2006.01)
B60J 3/04    (2006.01)

(52) U.S. Cl.
CPC ........................ B60J 3/04 (2013.01)

(58) Field of Classification Search
CPC ................. G02F 1/13318; B60J 3/04
See application file for complete search history.

(56) References Cited

U.S. PATENT DOCUMENTS

| | | | | |
|---|---|---|---|---|
| 5,781,105 A | * | 7/1998 | Bitar ...................... | B60Q 1/085 340/438 |
| 5,796,094 A | * | 8/1998 | Schofield ............... | B60N 2/002 250/208.1 |
| 5,837,994 A | * | 11/1998 | Stam ..................... | B60Q 1/085 250/208.1 |
| 5,990,469 A | * | 11/1999 | Bechtel ................ | B60Q 1/1423 250/208.1 |

(Continued)

FOREIGN PATENT DOCUMENTS

CN    1112494 A    11/1995
CN    102991411 A    3/2013

*Primary Examiner* — Elmito Breval
(74) *Attorney, Agent, or Firm* — Zhigang Ma

(57) ABSTRACT

An automobile includes an anti-dazzling system and a luminous body. The anti-dazzling system includes a sensing module, a calculating unit, a controlling module and a display module. The sensing module includes a signal receiver and a recorder. The signal receiver defines a through hole and a signal receiving chip is received therein. The signal receiving chip can receive infrared light through the hole. The recorder can obtain an emitting time and a receiving time of the infrared light, and send the emitting time and the receiving time to the calculating unit. The calculating unit calculates a size and a location of the display module to be shielded, and sends the size and the location of area to be shielded to the controlling module to control the correspondingly area of the display module being opaque or translucent. The present disclosure also provides an anti-dazzling method.

12 Claims, 4 Drawing Sheets

(56) References Cited

U.S. PATENT DOCUMENTS

| | | | | |
|---|---|---|---|---|
| 8,376,595 | B2* | 2/2013 | Higgins-Luthman | B60Q 1/143 340/523 |
| 8,564,204 | B2* | 10/2013 | Sugimoto | B60Q 1/1423 315/159 |
| 8,964,024 | B2* | 2/2015 | Schut | H04N 7/18 348/113 |
| 9,171,217 | B2* | 10/2015 | Pawlicki | H04N 5/247 |
| 9,187,029 | B2* | 11/2015 | Wright | B60Q 1/143 |
| 2004/0201483 | A1* | 10/2004 | Stam | B60Q 1/1423 340/600 |
| 2005/0036325 | A1* | 2/2005 | Furusawa | B60Q 1/06 362/460 |
| 2008/0267604 | A1* | 10/2008 | Sung | G03B 13/36 396/125 |
| 2009/0085730 | A1* | 4/2009 | Goto | B60S 1/0837 340/425.5 |
| 2012/0249900 | A1* | 10/2012 | Koike | G02F 1/133528 349/15 |

\* cited by examiner

AUTOMOBILE AND ANTI-DAZZLING METHOD FOR AUTOMOBILES

FIELD

The subject matter herein generally relates to an automobile and an anti-dazzling method for automobiles.

BACKGROUND

When a driver drives at night, the lights in front of the automobile can be transmitted to the driver through the windshield, or illumination from lights of automobiles approaching from the back are projected to the driver by being reflected onto the rear view mirror which may dazzle (e.g., temporarily blind) the driver. Thus, the driver may feel uncomfortable, and in some cases, the driver may not see anything for a few seconds, which may cause an accident.

BRIEF DESCRIPTION OF THE DRAWINGS

Implementations of the present technology will now be described, by way of example only, with reference to the attached figures.

DETAILED DESCRIPTION

Figure 1:
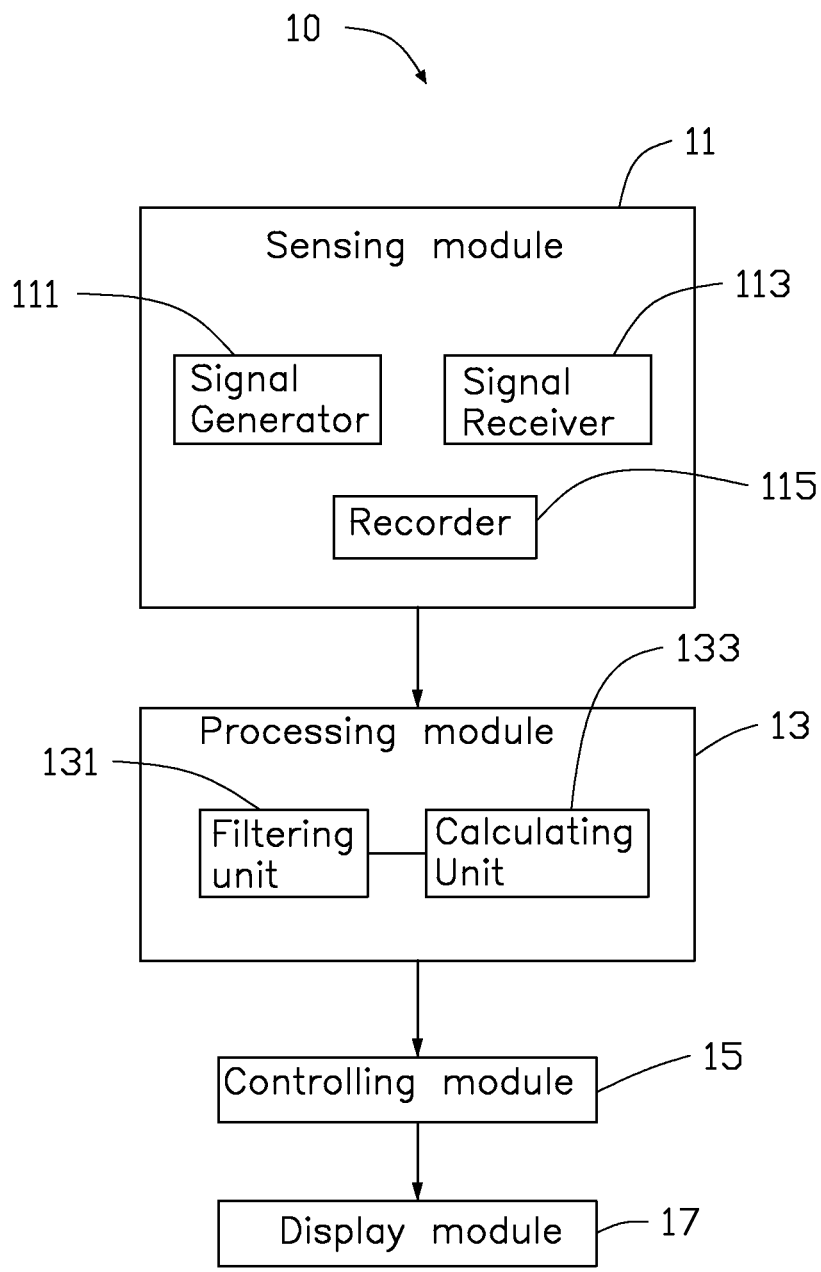
FIG. 1 is a block diagram of one embodiment of an anti-dazzling system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising" when utilized, means "including, but not necessarily limited to"; it specifically indicates open-ended inclusion or membership in the so-described combination, group, series and the like.

The present disclosure is described in relation to an automobile and an anti-dazzling system.

Figure 2:
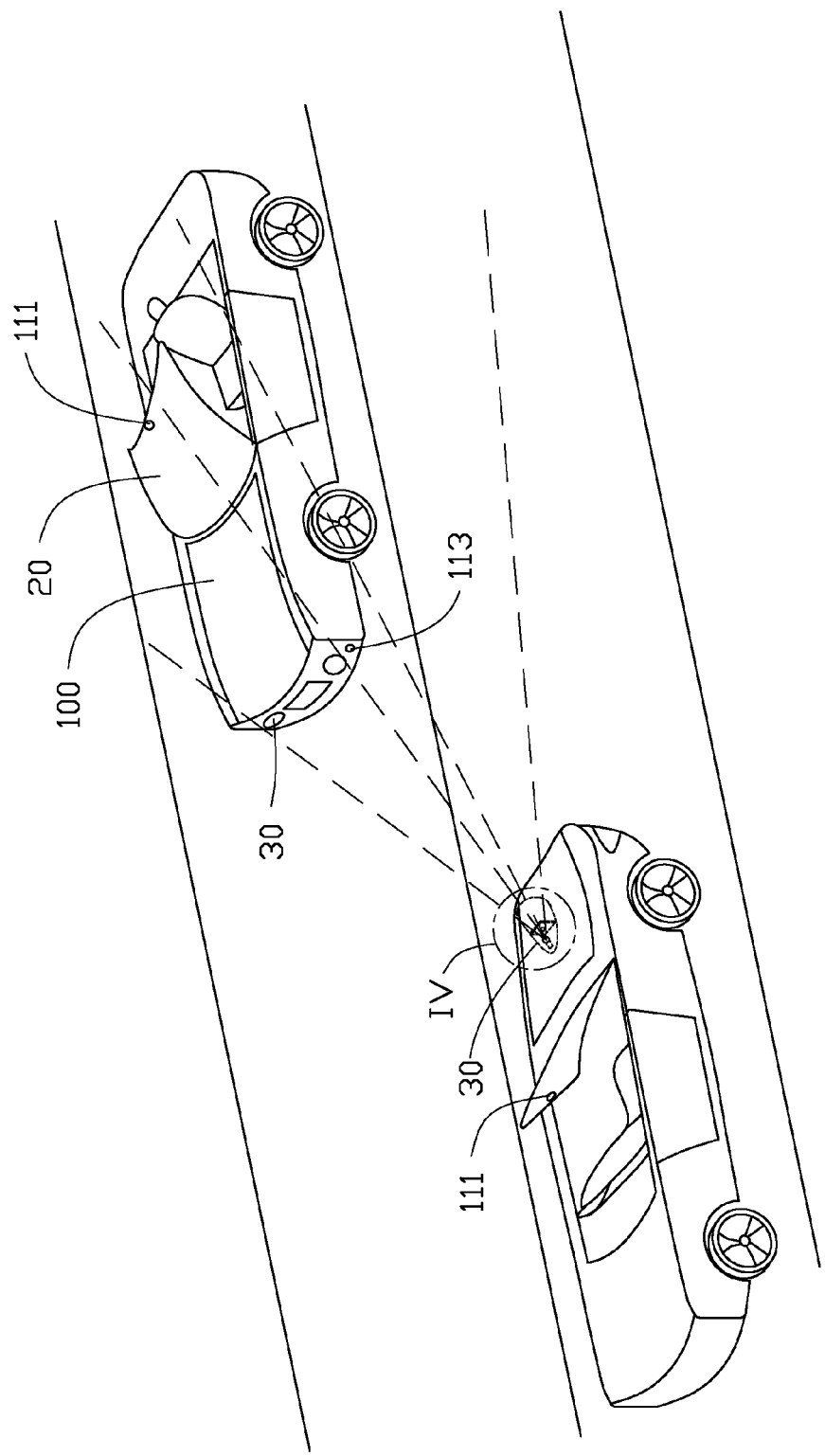
FIG. 2 is a diagrammatic view of one embodiment of an automobile.

FIG. 1 and FIG. 2 illustrate that an automobile 100 includes an anti-dazzling system 10, a windshield 20, and a high beam 30. When the high beam 30 is open, the anti-dazzling system 10 can prevent dazzling the driver of an oncoming automobile caused by light from the high beam 30.

The anti-dazzling system 10 can include a sensing unit 11, a processing unit 13, a controlling unit 15, and a display unit 17 electrically connected in sequence. The sensing unit 11 can be configured to transmit and receive signals. The processing unit 13 can be configured to calculate an area to be shaded on the display module 17 based on the signal send by the sensing unit 11. The controlling unit 15 can be configured to control the displaying module 17 based on the calculated result of the processing unit 13. The area on the display module 17 can be opaque to shield the incident light to the windshield 20.

The sensing unit 11 can include a signal generator 111, a signal receiver 113, and a recorder 115. In at least one embodiment, the signal generator 111 can be an infrared signal generator. The signal generator 111 can be fixed at a central portion of the windshield 20 and configured to store and transmit an infrared signal with signal codes. The signal codes can include a signal code for requesting to open the anti-dazzling system 10, a signal code of a windshield size of this vehicle, and other signal codes. The signal code including the windshield size can record the size of the windshield 20 of this automobile 100.

The signal receiver 113 can be an infrared signal receiver and can be fixed near the high beam 30. The signal receiver 113 can be configured to receive the signal codes from the signal generator 111 and send the signal codes to the calculating unit 133. The recorder 115 can be fixed on the automobile 100 and configured to recode a time T1 of transmitting the signal codes by the signal generator 111, and a time T2 of receiving the signal codes by the signal receiver 113. The recorder 115 can send the time information T1 and T2 to the processing unit 13. In at least one embodiment, the recorder 115 can be a time synchronization server to obtain precise time in GPS time system.

Figure 3:
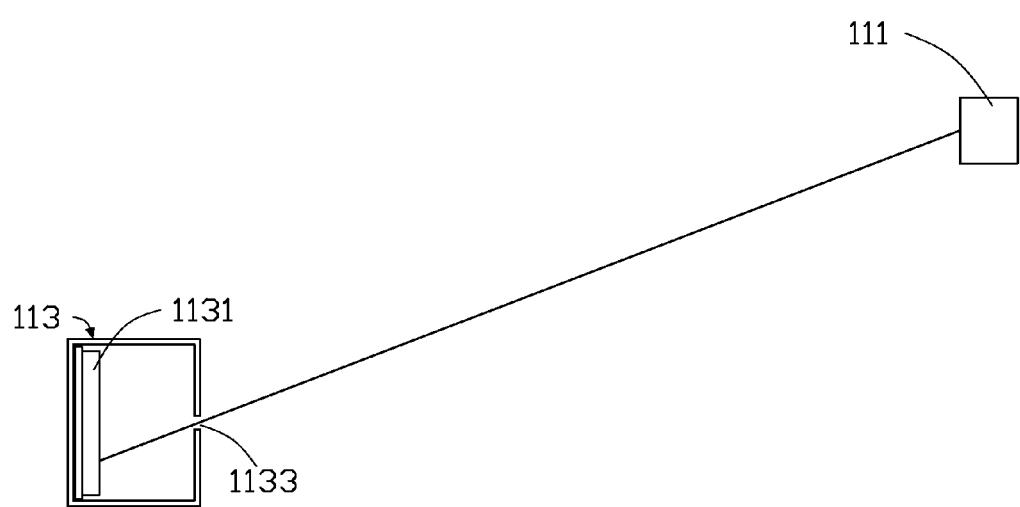
FIG. 3 is a diagrammatic view of a signal generator and a signal receiver in FIG. 1.

FIG. 3 illustrates that the signal receiver 113 can include a receiving chip 1131 therein and define a through hole 1133. The infrared light transmitted by the signal generator 111 can hit a point of the receiving chip 1131 via the through hole 1133 and received by the receiving chip 1131.

Referring to FIG. 1 through FIG. 3, the processing unit 13 includes a filtering unit 131 and a calculating unit 133 electrically connected to the filtering unit 131. The processing unit 13 can be fixed in the automobile 100. The filtering unit 131 can be electrically connected to the signal receiver 113, and configured to process the signal transmitted by the signal receiver 113 and filter out the signal codes of requesting to open the anti-dazzling system 10 and the size of the windshield 20, then send the signal codes to the calculating unit 133. The calculating unit 133 can encode the signal codes, obtain the signal of requesting to open the anti-dazzling system 10 and the size of the windshield 20, and obtain a two dimension coordinates of the receiving point on the signal receiving chip 1131. Then, the calculating unit 133 can calculate an angle between the signal generator 111 and the signal receiver 113 based on the two dimension coordinates of the receiving point and a distance between the through hole 1133 and the signal receiving chip 1131. The angle between the signal generator 111 and the signal receiver 113 can reflect an angle between the high beam 30 and the windshield 20. The calculating unit 133 can calculate a distance between the signal generator 111 and the signal receiver 113 based on the time T1 of transmitting the signal, the time T2 of receiving the signal, and the speed of the infrared light, thus a distance between the two automobiles 100 can be obtained.

The controlling module 15 can be electrically connected to the calculating unit 133. The calculating unit 133 can send the signals including the windshield size of the oncoming automobile 100, the angle between the light beam 30 and the windshield 20 of the oncoming automobile 100, and the distance between the two automobiles 100 to the controlling module 15. The controlling module 15 can control the display module 17 to form an shielding area according to the signal. In at least one embodiment, the display module 17 can be a transparent liquid crystal display. The shielding area can be opaque.

Figure 4:
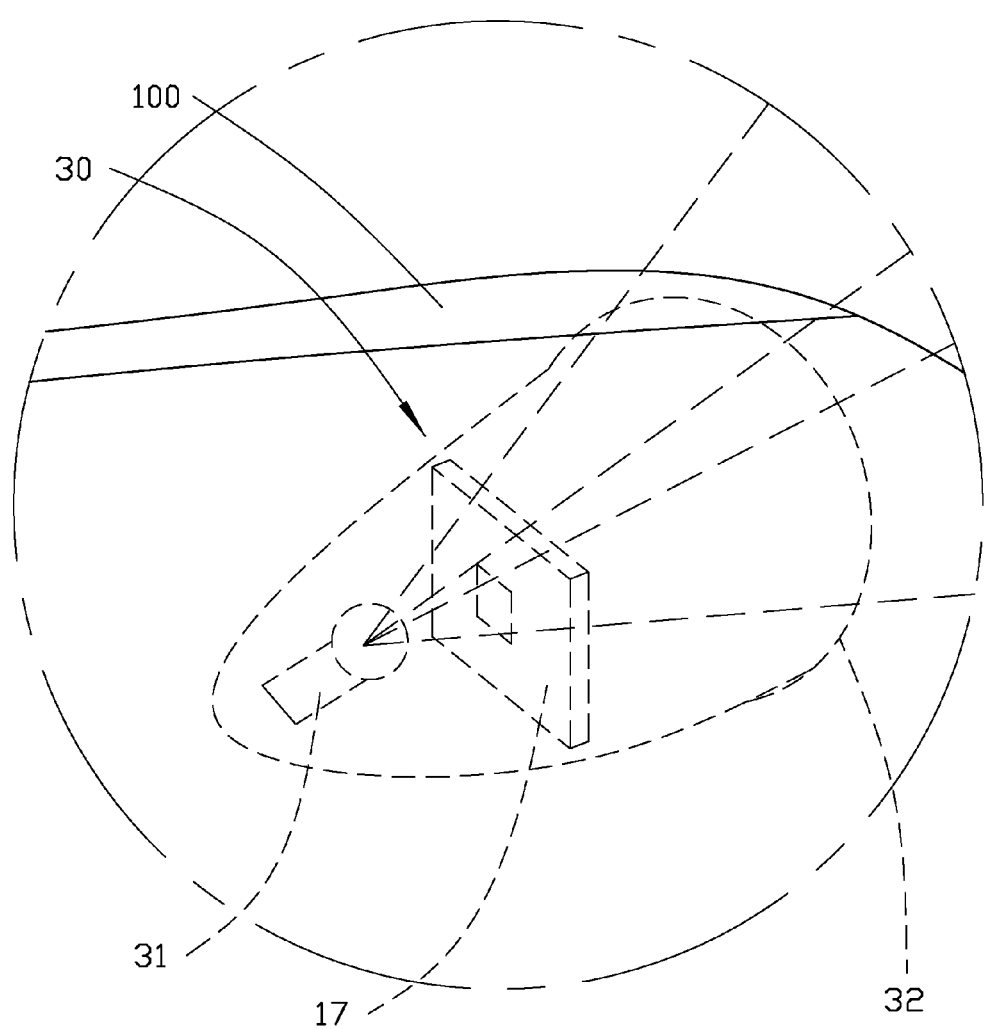
FIG. 4 is a partial, enlarged view of the portion IV of the automobile in FIG. 2.

FIG. 4 illustrates that the high beam 30 can include a luminance body 31 and a housing 32. The housing 32 can be positioned around the luminance body 31 to encase the luminance body 31. The display module 17 can be positioned in the housing 32 and in front of the luminance body 31. When the display module 17 forms the area to be shielded controlled by the control module 17, the light illuminated from the luminance body 31 would not hit the windshield 20 of the oncoming automobile 100.

In use, the signal generator 111 of the oncoming automobile 100 can transmit the signal codes including the signal code for requesting to open the anti-dazzling system 10, the signal code including the size of the windshield 20 of the oncoming automobile, and the recorder 115 can record the time T1 of transmitting the signal codes of the signal generator 111 at the same time. The signal receiver 113 mounted on this automobile 100 can receive the signal codes, and the recorder 115 can record the time T2 of receiving the signal codes. The signal receiver 113 can send the signal codes to the processing module 13, and the filtering unit 131 can filter out the signal code for requesting to open the anti-dazzling system 10, and the signal code of the size of the windshield 20 of the oncoming automobile 100. The distance between the signal generator 111 and the signal receiver 113 can reflect the distance between the two automobiles 100, and the angle between the signal generator 111 and the signal receiver 113 can reflect the angle between the high beam 30 and the windshield 20.

The signal codes then can be send to the calculating unit 133 of the processing module 13, and the calculating unit 133 can encode the signal codes and calculate the two dimension coordinates of the receiving point on the signal receiving chip 1131. Then, the calculating unit 133 can calculate the angle and distance between the signal generator 111 of the oncoming automobile 100 and the signal receiver 113 of this automobile 100 based on the time T1 and the time T2, and the two dimension coordinates of the receiving point on the signal receiving chip 1131.

If the calculating unit 133 obtains the signal that there is no need to open the anti-dazzling system 10, the signal can be break up in the calculating unit 133. If the calculating unit 133 obtains the signal hat there is a need to open the anti-dazzling system 10, the calculating unit 133 can calculate a size and a location of the shielding area on the display module 17 based on the distance between the two automobiles 100, the angle between the high beam 30 and the windshield 20, and the distance between the luminance body 31 and the display module 17 which is known. The calculating unit 133 can send the signal including the size of the area to the controlling unit 15, and the controlling unit 15 can control the display module 17 to form the shielding area to be opaque. Therefore, the light from the luminance body 31 would not hit the windshield 20 of the oncoming automobile 100 to prevent driver's dazzling.

The automobile 100 can obtain the size of the windshield 20 and calculate the shield area of the display module 17 by the sensing unit 11 and the processing unit 13, and can control the display module 17 to form the area to be shielded controlled by the controlling module 15, thus the light from the luminance body 31 would not light on the windshield 20 of the oncoming automobile 100 to prevent driver's dazzling.

In other embodiments, the liquid crystal display can be colorful, such as gray or tawny, as long as it can form the area which is opaque.

In other embodiments, the area to be shielded of the display module 17 can be translucent.

In other embodiments, the filtering unit 131 can be omitted.

In other embodiments, the signal receiver 113 can fixed at any position of the automobile 100, as long as the infrared light can be received by the signal receiving chip 1131 via the through hole 1133. Then the angle between the high beam 30 and the windshield 20 can not reflected by the angle between the signal generator and the signal receiver 113. A location relationship between the signal receiver 113 and the high beam 30 can be stored in the calculating unit 133, and the calculating unit 133 can calculate an angle between the signal receiver 113 and the signal generator 111, and then calculate an angle between the high beam 30 and the windshield 20 based on the angle between the signal receiver 113 and the signal generator 111 and the location relationship between the signal receiver 113 and the high beam 30.

In other embodiments, the signal generator 111 can fixed at any position of the automobile 100, as long as the infrared light can be received by the signal receiving chip 1131 via the through hole 1133. Then the angle between the high beam 30 and the windshield 20 can be related to a location relationship between the signal generator 111 and the windshield 20. A signal including the location relationship between the signal generator 111 and the windshield 20 can be stored in the signal generator 111, and the signal generator 111 can send the signal to the signal receiving chip 1131. The calculating unit 133 can calculate the angle between the high beam 30 and the windshield 20 based on the location relationship between the signal generator 111 and the windshield 20.

The embodiments shown and described above are only examples. Many details are often found in the art such as the other features of an automobile and a method of anti-dazzling for automobiles. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. An automobile comprising:
 a high beam including a luminance body; and
 an anti-dazzling system configured to prevent dazzling a driver of an oncoming automobile, the anti-dazzling system comprising:
 a sensing module having a signal receiver mounted on the automobile and a recorder;
 a processing module including a calculating unit;
 a controlling module; and
 a display module positioned in front of the luminance body;

wherein the sensing module, the processing module, the controlling module, and the display module are electrically connected in sequence;

wherein the signal receiver includes a signal receiving chip therein and defines a through hole; the signal receiving chip is adapted for receiving an infrared light carrying signal codes including a signal code of a windshield size of a windshield of the oncoming automobile via the through hole; the recorder is configured to obtain an emitting time and a receiving time of the infrared light;

wherein the signal receiver and the recorder are configured to send the infrared signal, the emitting time and the receiving time of the infrared light to the calculating unit;

wherein the calculating unit is adapted for calculating a distance between the signal receiver and a point at which transmitting the infrared light based on the emitting time and the receiving time, and calculating an incident angle of the infrared light based on a point on the signal receiving chip received the infrared light and the location of the through hole, such that a size and a location of an area of the display module to be shielded can be calculated by the calculating unit based on the distance between the luminance body and the display module in combination with the windshield size of the oncoming automobile, and fed back to the controlling module; and wherein a portion of the display module is configured to prevent the light illuminated from the luminance body from glaring the driver of oncoming automobile.

2. The automobile as claimed in claim 1, wherein the sensing module further comprises a signal generator mounted on the automobile, and the signal generator is configured to transmit the infrared light carrying the signal codes including the windshield size.

3. The automobile as claimed in claim 2, wherein the signal codes carried by the infrared light further includes a signal code of a location relationship between the windshield and the signal generator.

4. The automobile as claimed in claim 3, wherein the signal codes carried by the infrared light further includes a signal code of requesting to open the anti-dazzling system.

5. The automobile as claimed in claim 4, wherein the processing module further comprises a filtering unit electrically connected to the signal generator and the calculating unit, and the filtering unit is capable of filtering out the signal code of requesting to open the anti-dazzling system, the signal code of the location relationship of the windshield and the signal generator, and the signal code of the windshield size, and sending the signal to the calculating unit.

6. The automobile as claimed in claim 1, wherein the display module is a liquid crystal display, and the portion configured to prevent the light illuminated from the luminance body from glaring the driver of oncoming automobile is opaque or translucent.

7. An anti-dazzling method for automobiles comprising:
transmitting an infrared light carrying signal codes comprising a windshield size by a signal generator, and recording an emitting time of the infrared light by a recorder;

receiving the infrared light by a signal receiving chip received in a signal receiver via a through hole defined on the signal receiver, and recording a receiving time of the infrared light by the recorder;

sending to the signal codes received by the signal receiver to a calculating unit of a processing module by the signal receiver, and sending the emitting time and the receiving time to the calculating unit by the recorder;

calculating a distance between the signal generator and the signal receiver based on the emitting time, the receiving time, and calculating an incident angle of the infrared light toward the signal receiving chip based on a location of the receiving point of the signal receiving chip and a location of the through hole by the calculating unit;

calculating a location and a size of an area to be shielded on a display module based on the distance between the luminance body and the display module in combination with the windshield size, and sending a signal of the location and the size of the area to be shielded to a controlling module; and controlling the area to be shielded on the display module to be opaque or translucent.

8. The anti-dazzling method for automobiles as claimed in claim 7, wherein the anti-dazzling method further comprises a step of encoding the signal codes by the calculating unit.

9. The anti-dazzling method for automobiles as claimed in claim 7, wherein the signal codes carried by the infrared light transmitted from the signal generator comprises a signal code of the windshield size of the automobile.

10. The anti-dazzling method for automobiles as claimed in claim 9, wherein the signal codes carried by the infrared light transmitted from the signal generator further comprises a signal code of a location relationship between the windshield and the signal generator.

11. The anti-dazzling method for automobiles as claimed in claim 10, wherein the signal codes carried by the infrared light transmitted from the signal generator further comprises a signal code for requesting to open the anti-dazzling system.

12. The anti-dazzling method for automobiles as claimed in claim 11, wherein the processing module further comprises a filtering unit, and the filtering unit is configured to filter the signal codes received by the signal receiver and filter the signal codes of the windshield size, the location relationship between the windshield and the signal generator, and the request to open the anti-dazzling system.

* * * * *